Patented Sept. 12, 1944

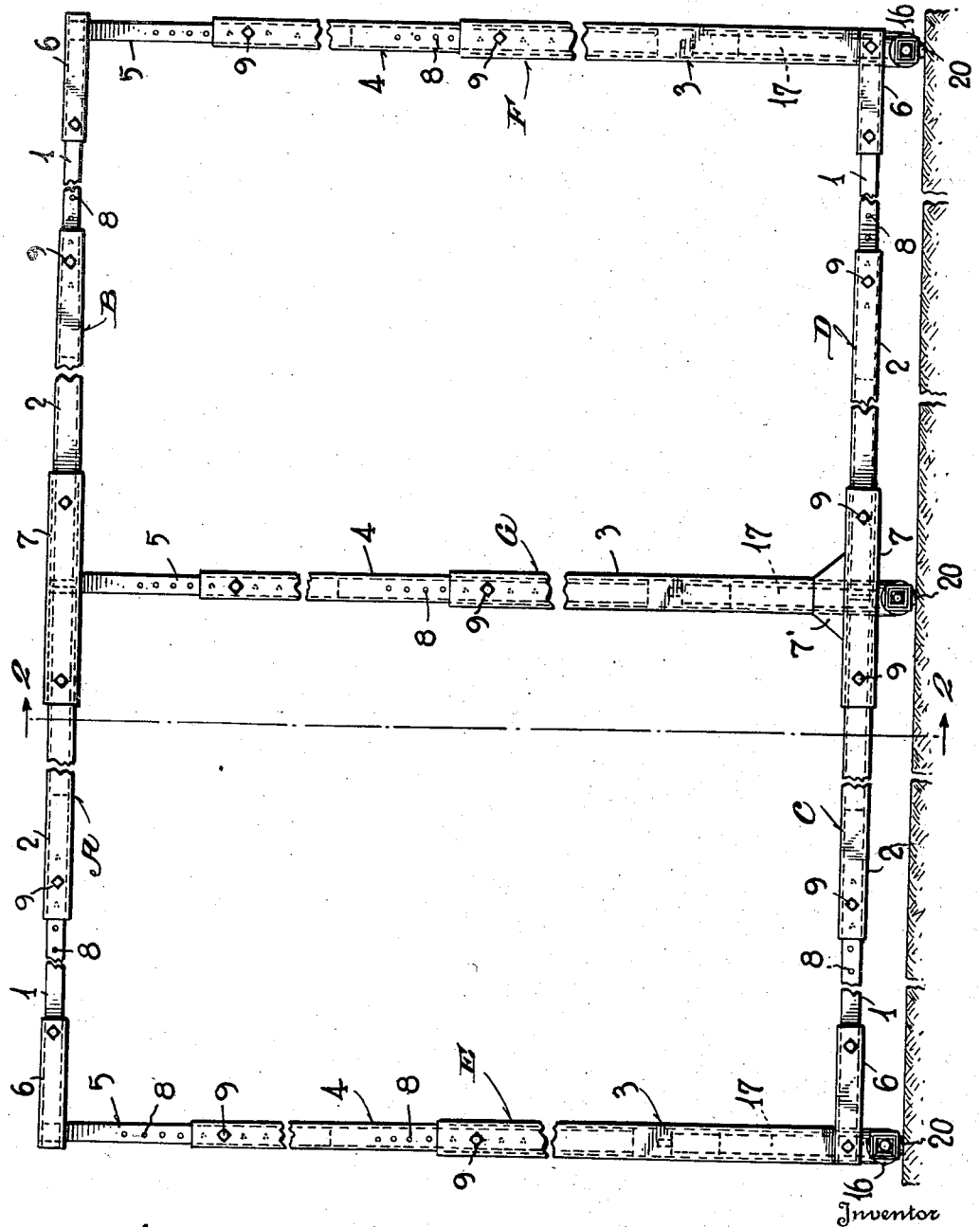

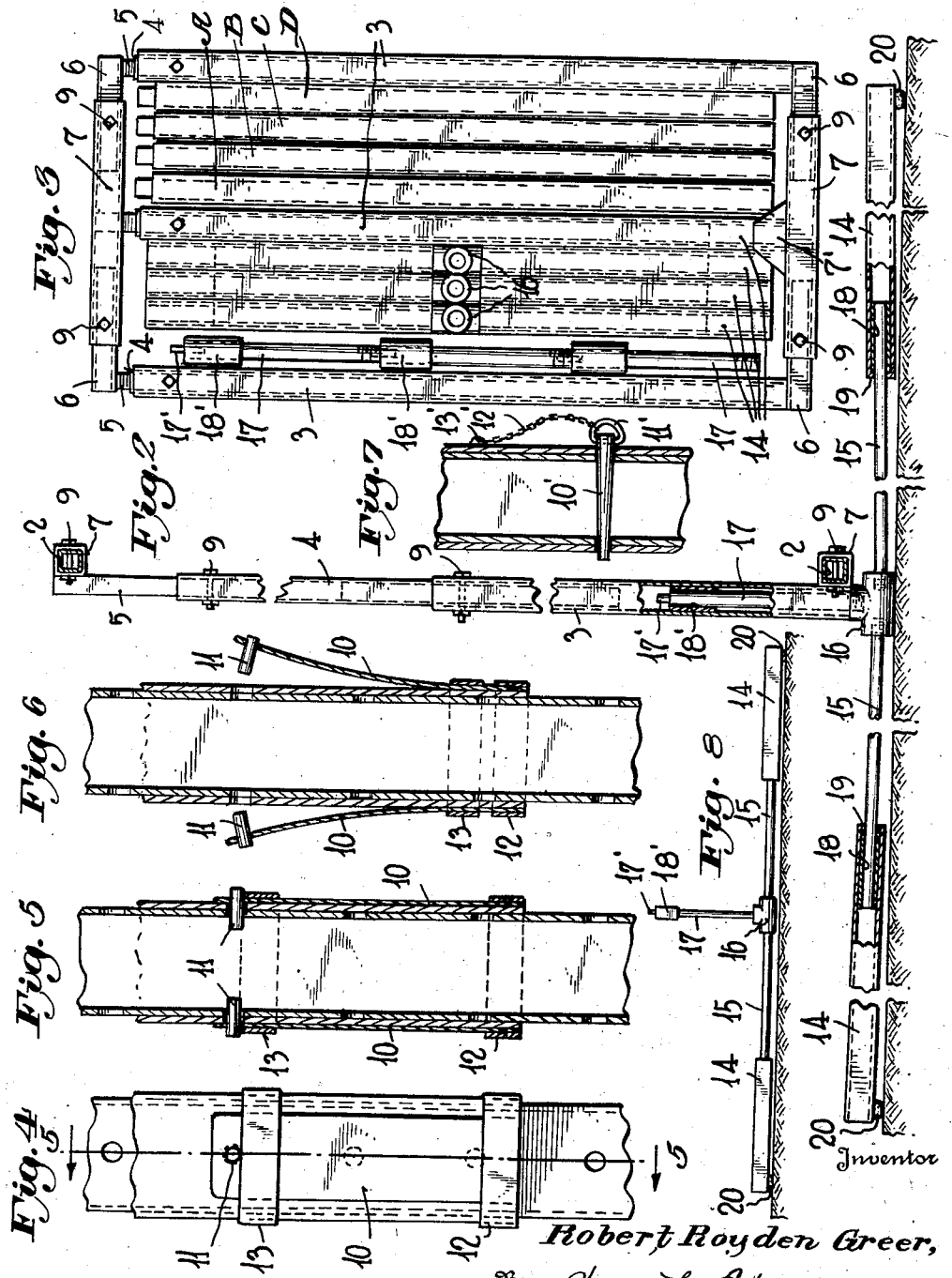

2,357,819

UNITED STATES PATENT OFFICE 2,357,819

SUPPORTING FRAME FOR SCREENS

Robert Royden Greer, Brooklyn, N. Y.

Application June 7, 1940, Serial No. 339,401

16 Claims. (Cl. 160—351)

This invention relates to adjustable supporting frames and while adapted to support and display various articles, such as maps, rugs, etc., it is particularly adapted for supporting a screen for use with a projecting machine, and for supporting portable backgrounds for photographers and the like.

An object of this invention is to provide an adjustable collapsible and portable frame for supporting a screen.

Another object of the invention is to provide an adjustable screen supporting frame having locking means carried by the frame so that the frame may be quickly and easily erected or dismantled without the danger of losing any of the locking parts.

A further object of the invention is to provide a telescopic frame of sturdy light weight construction which may be adjusted to various heights and widths so as to accommodate different size screens, backgrounds, and the like.

A still further object of the invention is to provide an adjustable frame of neat appearance which is constructed of telescopic sections in such a manner that when the frame is dismantled the main vertical sections may be telescoped together so as to form a very small compact frame inside of which the legs, horizontal sections and connecting members will fit so that the whole dismantled assembly will form a very neat package which may be easily transported in a vehicle such as an automobile and will take up very little space.

It is also an object to provide a screen supporting frame which may be manufactured to sell at an original low cost and which will be free from upkeep expenses.

Other objects and advantages will be apparent from the following description taken in connection with the accompanying drawings.

In such drawings:

Fig. 1 is a front elevational view of the frame in erected position;

Fig. 2 is a sectional view taken on the line 2—2 of Fig. 1;

Fig. 3 is a plan view illustrating the frame in its portable condition having its removable parts enclosed in the frame;

Fig. 4 is a detail view showing the locking sleeve holding two telescopic members together;

Fig. 5 is a sectional view on line 5—5 of Fig. 4;

Fig. 6 is a detailed view showing the locking sleeve in unlocked condition;

Fig. 7 is a sectional view showing a modified form of locking device connecting two telescopic members together; and Fig. 8 is a diagrammatic end elevational view showing the legs and joints out of contact with their supporting surface as will be the case when the frame is not supporting an article.

Referring to the drawings in detail, the supporting frame is composed of a number of telescopic sections made up of hollow tubing or pipe. This tubing or pipe may be formed of any desired material such as metal, wood, or any plastic material. However, it is desired to construct the frame of the present invention of light weight steel because of the durability and low cost of this material. The tubing or pipe forming the sections of the frame may be of any desired shape, but in order to enhance the appearance of the frame and at the same time lend strength when is is erected, it is preferable that square tubing be used.

The horizontal sections A, B, C and D are exact duplicates of each other and each may be interchangeably used instead of any of the others. This lends to the simplicity of erecting the frame. These sections are comprised of two members 1 and 2 which are adapted to be telescoped one within the other.

Vertical sections E and F, which form the sides of the frame, and vertical section G, which forms the middle support for the frame, are each composed of three members 3, 4 and 5, such members also being adapted to be telescoped one within the other so that the frame may be adjusted to various heights in order to support screens of different heights.

Tubes 6 are rigidly secured preferably, although not necessarily, by means of welding to the top of the front face of member 5 and to the front face of the bottom of member 3 of the side sections, thus forming rigid corners for the frame. The front face of the top member 5 and the front face of the bottom member 3 of the middle section G have secured to them, preferably by means of welding, tubes 7 open at both ends so as to engage one end of the members 2 while one end of the members 1 is adapted to be held by the open ends of tubes 6. In order to add strength to the middle section braces 7' may extend from the lower tube 7 so as to engage the sides of the member 3 of the section G. These braces may be held in place by means of welding. In some instances it may be desirable to have similar braces extending from the upper tube 7 to the member 5 of section G. Thus it will be seen that due to the telescopic relation of the members 1 and 2, the frame may be adjusted horizontally and screens of different widths accommodated. Any appropriate means may be used for suspending the screen from the top of the frame.

In order that the frame may be easily adjusted both vertically and horizontally with the minimum of effort, all of the telescopic sections may be provided with a plurality of apertures 8. For convenience in erecting the frame, corresponding or like tubular members may have their apertures numbered, lettered, or in any way designated to correspond one with the other so that the frame may be adjusted as to height or width by merely inserting the fastening means in the same designated aperture of each of the horizontal or vertical members. By having the apertures numbered or lettered it is merely necessary to adjust one of the sections to the desired height or width. After one section is adjusted all other corresponding sections may be easily adjusted by merely putting the fastening members in the same designated aperture as the fastening member in the adjusted section. As shown in Fig. 1, each of the fastening members 9 is inserted in the same aperture of the corresponding vertical sections 5, namely the sixth aperture from the top.

Any connecting means capable of passing through the apertures may be used for holding the telescoped members in adjusted position. In Fig. 1 bolts 9 are shown as the connecting means. However, I prefer to use a spring actuated type of fastener as shown in Figs. 4, 5 and 6 in which the fastener is carried by one of the tubular members. As will be seen, this snap fastener comprises a spring 10 having a stud 11 projecting through it near one of its ends, while the other end of the spring is connected to a collar or sleeve 12.

A sliding sleeve 13 is adapted to surround the spring and is slidable up and down on the spring but is limited in its movement by means of the small projecting end of the stud 11. When connecting two tubular members together, it is merely necessary to raise the sleeve 13 sufficiently to cause the spring 10 to project the stud 11 into the aligned apertures of the tubular sections. For dismantling purposes when the sleeve 13 is lowered, the spring 10 withdraws the stud 11 from the aligned apertures. Thus, it will be seen that there is no chance of losing any of the connecting means since there are no loose parts, but all parts are carried by one of the tubular members. In order to lend strength to the frame, it is desirable to use a double spring actuated fastener for each connection as shown in Figs. 4, 5 and 6.

Fig. 7 discloses a modified form of fastening means carried by one of the telescopic members for connecting the members together. The modified form of fastening means comprises a tapered pin 10' which is connected by means of a ring 11' to one end of a chain 12', while the other end of the chain is secured to and carried by one of the telescopic members by any type of fastening means 13'. In order to connect the tubular members together by means of the pin 10', it is merely necessary to insert the pin in the aligned apertures and give it a slight turn. The pin 10' may be formed of any desired material such as metal, wood, hard or soft rubber, or any type of plastic material. Because of the shape of the pin, it may be desirable to form it out of rubber which has a certain amount of flexibility in order to form a tight connection.

Referring to Fig. 2, it will be seen that telescopic feet extend on both sides of the vertical members, and it will be apparent that these feet may be adjusted to accommodate the frame whether a small or large space is allowed for its erection. These feet comprise a tubular section 14 into which is telescoped a cylindrical bar 15. This bar is preferably solid so as to give strength and weight to the feet and thereby hold the frame in rigid position. The feet are attached to the bottom of the vertical members by having one end of the bar 15 threaded into the joint 16, while the upper end of the joint 16 is adapted to receive a screw threaded pipe or bar 17 which is inserted into the lower end of the member 3, thereby not only strengthening the lower ends of the member 3 but at the same time forming a tight fit between the joint 16 and such member. As will be seen the bar or rod 17 is provided at one end with a threaded projection or pin 17' and a tubular member 18' which is substantially the same shape as the member 3. As will be apparent, the member 18' is adapted to hold the bar 17 in slidable engagement with member 3. In order that the bar 15 will not become disengaged from the tubular member 14, it is deemed advisable to place a shim or tube 18 on one end of the bar 15, and also to form flanges 19 at the outer end of the tubular member 14, and by this construction it will be seen that a slidable connection for the bar 15 and member 14 is provided.

Referring to Fig. 8, knobs 20 of rubber or like material are provided on the bottom at the outer end of the member 14 and thus raise the joint and feet from contact with their supporting surface when the frame is not supporting an article. However, when an article is supported on the frame, the article tends to weight down the frame and cause the joint or connecting member 16, which is normally raised due to the knobs 20, to sag and engage the supporting surface, thus holding the frame in a very rigid position. If desirable, casters or rollers may replace the knobs 20 in order that the frame may be readily moved about.

When dismantling the frame, it is necessary merely to remove the sections A, B, C and D and drop the sections E, F and G into their lowermost telescoped position. The vertical sections are then telescoped together, members 6 telescoping into members 7. The joints 16, with their projecting rods 17, are disengaged from the lower end of the member 3 and the rod or bar 17 is unscrewed from joint 16. The horizontal sections as well as the telescopic legs may then be collapsed into their shortest length, which it will be seen is less than the collapsed length of the vertical sections. It is due to this construction that the legs and horizontal sections, when telescoped, may be inserted inside of the frame formed by the telescoping together of the vertical sections. It will also be observed that the threaded pipes 17 are adapted to thread into one another so as to form a unitary pipe, and it is for this purpose that the pins or projections 17' are provided on the end of the pipes. The assembled pipes may be inserted into the collapsed frame as shown in Fig. 3.

By reason of the fact that square tubing is used in forming the frame and the various removable parts, it is possible to have all of the removable sections, when in their dismantled position and assembled in the collapsed frame, lie substantially flush with the walls of the frame. Since it is possible to confine all the removable pieces within the contour of the collapsed frame, a very neat and compact package results, and much inconvenience is avoided in transporting the frame from place to place in its collapsed condition. Furthermore, the danger of parts becoming lost in transit is obviated.

While one embodiment of the invention has been shown and described, it is to be understood that various modifications thereof may be apparent to those skilled in the art without departing from the spirit and scope of this invention, and, therefore, the same is only to be limited by the scope of the appended claims.

I claim:

1. An adjustable frame comprising top, bottom and sides formed of telescopic members, said telescopic members being provided with a plurality of apertures, and spring actuated fasteners carried by the telescopic members and means slidable on certain of said telescopic members for engaging and moving the associated spring actuated fasteners for adjustably connecting said telescopic members together.

2. An adjustable screen supporting frame comprising vertical and horizontal telescopic sections, members rigidly carried by the top and bottom of said vertical members, said carried members being adapted to be telescoped together when the frame is in dismantled condition and the horizontal sections removed.

3. An adjustable screen supporting frame comprising vertical and horizontal telescopic sections, tubular members carried by the top and bottom of said vertical members, said tubular members being adapted to be telescoped together so as to form a frame when the horizontal members are removed from the vertical members.

4. An adjustable screen supporting frame comprising vertical and horizontal telescopic sections, said horizontal sections each including removable members, tubular members rigidly carried by the top and bottom of said vertical members, said tubular members being adapted to be telescoped together, in conjunction with said vertical sections, to form a frame when said removable horizontal members are removed, said frame formed by the telescoping together of the carried members being adapted to house the removable horizontal sections in their dismantled condition.

5. An adjustable screen supporting frame comprising vertical and horizontal telescopic sections, means carried by the vertical sections for engaging the ends of the horizontal sections and frame supporting members connected to the bottom of said vertical sections, and means on said supporting members for spacing the supporting members from contact with a supporting surface when the frame is not supporting an article, and said supporting members being adapted to engage the supporting surface when an article is supported on said frame, thereby holding said frame in a rigid position.

6. An adjustable frame comprising vertical and horizontal tubular telescopic sections, said vertical telescopic sections all being of the same length in their smallest collapsible position, means on said vertical sections adapted to be telescoped together and thus forming a frame when the horizontal sections are removed, said horizontal sections being adapted to be housed within the contour of the frame formed by the vertical sections.

7. An adjustable screen supporting frame comprising vertical and horizontal tubular telescopic members provided with connecting means, means on the top of said vertical members for engaging the ends of said horizontal members, said telescopic members being provided with apertures adapted to receive said connecting means carried by said telescopic members for holding said telescopic members in adjusted position, and telescopic feet attached to and extending outwardly from the lower end of said vertical members, said telescopic feet having raised portions at their outer ends.

8. An adjustable support comprising telescopic members said telescopic members being provided with apertures on opposite sides thereof and spring actuated fasteners carried by the telescopic members, said fasteners being adapted to engage said apertures on opposite sides of said telescopic members, and means on said telescopic members for simultaneously engaging said spring actuated fasteners for connecting said telescopic members together.

9. An adjustable support comprising telescopic members adapted to be telescoped together, and spring actuated fasteners carried by the telescopic members, the outer end of said fasteners being provided with a stud, and means movable on said telescoped members for moving said spring actuated fasteners for adjustably connecting said telescoped members together, the movement of said means being stopped upon its engagement with the stud of said fastener.

10. An adjustable support comprising telescopic members, means encircling the outer telescopic members and a flexible member extending from said encircling means, said flexible member being provided at its outer end with a stud adapted to extend on either side of said flexible member, and means slidable on said telescopic member for moving said flexible member and thereby connecting said telescopic members together by means of one end of said stud, the other end of said stud adapted to limit the movement of said slidable means.

11. An adjustable support comprising telescopic members, means encircling the outer telescopic members and a flexible member extending from said encircling means, said flexible member being provided at its outer end with a stud adapted to extend on either side of said flexible member, and means slidable on said telescopic members, said slidable means being limited in its movement in one direction by said stud and in the other direction by said encircling means.

12. A support comprising top, bottom and sides, the bottom of said support being provided with a telescopic supporting member, said telescopic supporting member comprising a hollow member, and means adapted to be telescoped with said hollow member, said means being adapted to engage the inside of said hollow member and thereby provide a slidable connection between said means and the hollow member.

13. A support comprising top, bottom and sides, the bottom of said support being provided with a telescopic supporting member, said telescopic supporting comprising a hollow member having its end flanged and means adapted to telescope through said flanged end of said hollow member.

14. A support comprising top, bottom and sides, the bottom of said support being provided with a telescopic supporting member, said telescopic supporting member comprising a hollow member having its end flanged and a solid member provided with means having a slidable connection with said hollow member, said flanged end of said hollow member limiting the movement of said solid member.

15. A support comprising top, bottom and sides, supporting members connected to and extending outwardly on either side of said support, and means on the bottom of said supporting members for engaging a supporting surface for spacing said support from contact with said supporting surface when the support is not supporting an article, said means on the bottom of said support being adapted to engage the supporting surface when an article is supported on said support, thereby holding said supporting rigid position.

16. An adjustable frame comprising vertical and horizontal telescopic sections and joint members severally connected to and engaging the bottom of said vertical sections, said joint members being adapted to engage and be supported by supporting means below said vertical and horizontal sections, said means extending outwardly from said vertical sections for holding the frame in erected position, said joint members being in contact with a supporting surface when an article is supported on the frame, thereby holding the frame in a rigid position.

ROBERT ROYDEN GREER.

CERTIFICATE OF CORRECTION.

Patent No. 2,357,819.  September 12, 1944.

ROBERT ROYDEN GREER.

It is hereby certified that error appears in the printed specification of the above numbered patent requiring correction as follows: Page 3, second column, line 70, claim 13, after "supporting" insert --member--; page 4, second column, line 2, claim 15, strike out the word "supporting" and insert instead --support in--; and that the said Letters Patent should be read with this correction therein that the same may conform to the record of the case in the Patent Office.

Signed and sealed this 4th day of December, A. D. 1945.

Leslie Frazer (Seal) First Assistant Commissioner of Patents.